United States Patent [19]

Kojima

[11] Patent Number: 5,420,636
[45] Date of Patent: May 30, 1995

[54] APPARATUS FOR AND METHOD OF TRANSMITTING VIDEO SIGNAL

[75] Inventor: Yuichi Kojima, Kanagawa, Japan

[73] Assignee: Sony Corporation, Tokyo, Japan

[21] Appl. No.: 60,640

[22] Filed: May 12, 1993

[30] Foreign Application Priority Data

May 19, 1992 [JP] Japan ................................. 4-125251
Oct. 27, 1992 [JP] Japan ................................. 4-311355

[51] Int. Cl.$^6$ .............................................. H04N 7/30
[52] U.S. Cl. ..................... 348/403; 348/405; 348/408; 348/419; 348/423
[58] Field of Search ............... 348/397, 398, 403, 405, 348/408, 419, 423; 358/432, 433; H04N 7/133

[56] References Cited

U.S. PATENT DOCUMENTS

| | | | |
|---|---|---|---|
| 4,969,040 | 11/1990 | Gharavi | 348/398 |
| 5,014,134 | 5/1991 | Lawton | 358/432 |
| 5,068,911 | 11/1991 | Resnikoff | 358/432 |

FOREIGN PATENT DOCUMENTS

| | | | |
|---|---|---|---|
| 0413570A2 | 2/1991 | European Pat. Off. | H04N 7/13 |
| 0442096A2 | 8/1991 | European Pat. Off. | H04N 7/13 |
| 0475251A2 | 3/1992 | European Pat. Off. | H04N 7/133 |
| 0654887 | 5/1991 | France | H04N 7/01 |

*Primary Examiner*—Howard W. Britton
*Attorney, Agent, or Firm*—Limbach & Limbach; Philip M. Shaw, Jr.

[57] ABSTRACT

The video signal containing portions locally unsuitable for coding is divided into a plurality of components and is coded by a method such as a Wavelet transform and then is transmitted. In this case, a first quantizing means controls a quantization characteristic per block consisting of small area segments of coefficients composed of respective components to make uniform a distortion within the picture and a visual obstacle caused by the distortion. A second quantizing means controls the quantization characteristic to make uniform a deterioration quantity of the entire picture within a range of a predetermined coded data quantity. It is therefore possible to effect the transmission with a stable picture quality against a variety of fluctuations in the video signal inputted.

22 Claims, 15 Drawing Sheets

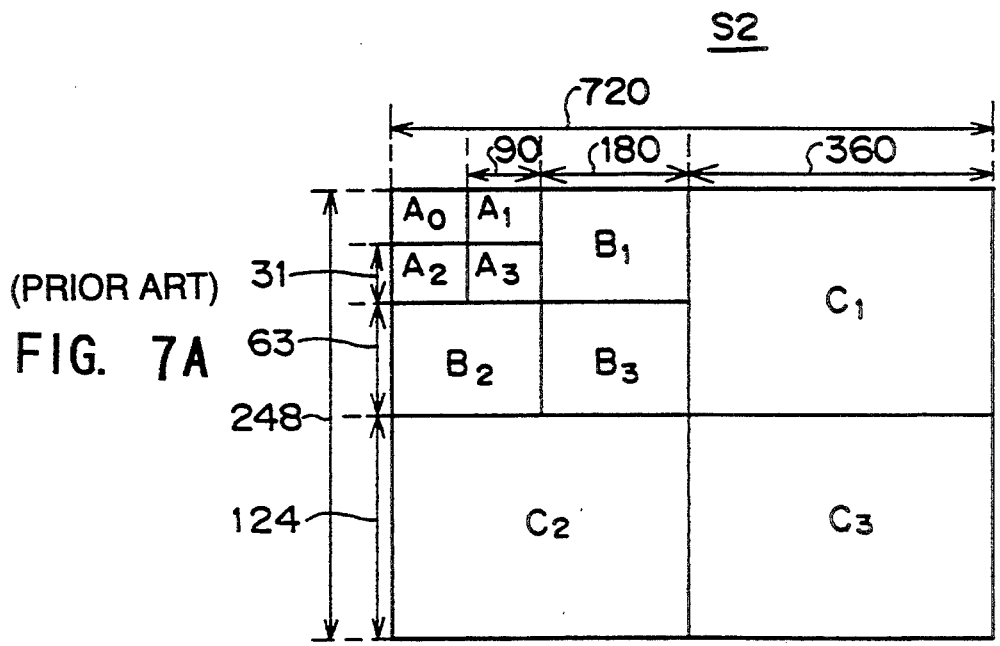
(PRIOR ART) FIG. 7A
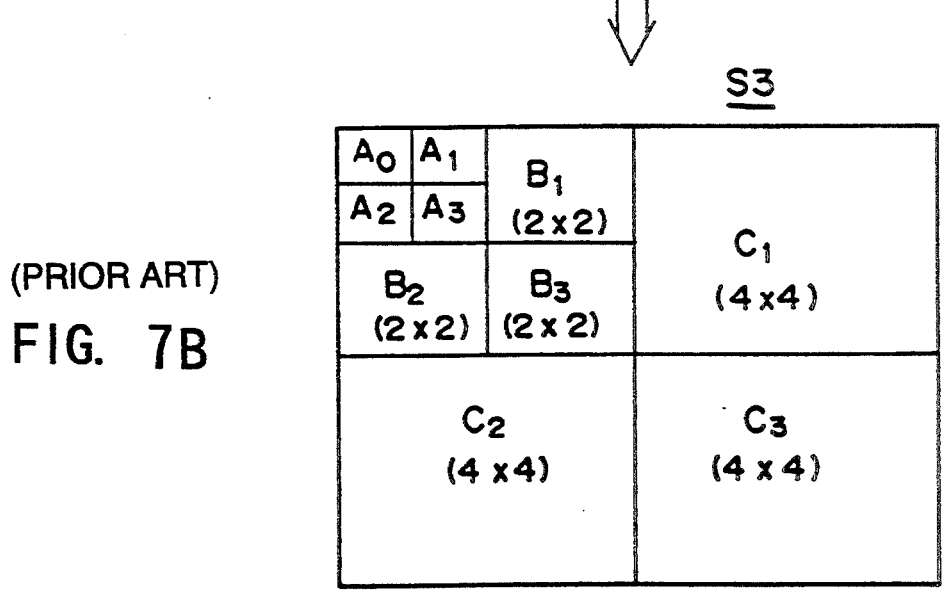
(PRIOR ART) FIG. 7B

| TRANSMITTING SEQUENCE | COMPONENTS | | | WEIGHTS | | | |
|---|---|---|---|---|---|---|---|
| | Y | $C_R$ | $C_B$ | 0 | 1 | 2 | 3 |
| 1 | $A_0$ | $A_0$ | $A_0$ | 1 | 1 | 1 | 1 |
| 2 | $A_1$ | $A_1$ | $A_1$ | 1 | 1 | 1 | 1 |
| 3 | $A_2$ | $A_2$ | $A_2$ | 1 | 1 | 1 | 1 |
| 4 | $A_3$ | $A_3$ | $A_3$ | 1 | 1 | 1 | 1 |
| 5 | $B_1$ | $B_1$ | $B_1$ | 1 | 7/8 | 6/8 | 5/8 |
| 6 | $B_2$ | $B_2$ | $B_2$ | 1 | 7/8 | 6/8 | 5/8 |
| 7 | $B_3$ | $B_3$ | $B_3$ | 1 | 7/8 | 6/8 | 5/8 |
| 8 | $C_1$ | — | — | 1 | 7/8 | 6/8 | 5/8 |
| 9 | — | $C_1$ | $C_1$ | 1 | 7/8 | 6/8 | 5/8 |
| 10 | $C_2$ | — | — | 1 | 7/8 | 6/8 | 5/8 |
| 11 | $C_3$ | — | — | 1 | 3/4 | 2/4 | 1/4 |
| 12 | — | $C_2$ | $C_2$ | 1 | 3/4 | 2/4 | 0 |
| 13 | — | $C_3$ | $C_3$ | 1 | 3/4 | 2/4 | 0 |

FIG. 14

APPARATUS FOR AND METHOD OF TRANSMITTING VIDEO SIGNAL

BACKGROUND OF THE INVENTION

1. Field of the Invention

The present invention relates to an apparatus for and method of transmitting a video signal and, more particularly, to those suitable for dividing a video signal into a plurality of components by use of a Wavelet transform, etc. and coding them.

2. Description of the Related Art

Heretofore, in a so-called video signal transmission system for transmitting a video signal to a remote place as in the case of, e.g., a video conference system, for the purpose of utilizing a transmission line at a high efficiency, a transmission efficiency is enhanced by efficiently coding significant information with the aid of a correlation of the video signals.

Coding methods making use of this correlation have used orthogonal transform coding methods such as a predictive coding method, DCT (discrete cosine transform), etc. and a method of coding after dividing the video signal into a plurality of components such as a subband coding method and a Wavelet transform method disclosed in U.S. Pat. Nos. 5,014,134 and 5,068,911. The predictive coding method has a disadvantage by which a deterioration of picture quality is easy to be detected when a compression rate is increased, though the method is easy to implement as far as equipment is concerned and suitable for applying to coding of a relatively low compression rate.

Further, the orthogonal transform coding method such as DCT, etc. has been often used because of obtaining a high picture quality in a relatively easy manner at a high compression rate. However, the video signal is coded after being divided into blocks consisting of small area segments defined by, e.g., 8 pixels ×8 lines. This causes the disadvantage that distortions conspicuously visible at boundaries between the blocks are produced, and an obstacle arising from a difference in degree of the distortion per block tends to be conspicuous to the eyes.

In contrast with this, a subband coding method and a Wavelet transform method have an advantage that the distortions at the block boundaries and fluctuations in distortion due to the blocks are less conspicuous than in a DCT method of performing coding per block because of dividing the video signal into components with respect to an entire picture.

For example, the Wavelet transform method among them is intended to code low frequency channel components per component obtained by recursive dividing in accordance with characteristics thereof. The processing with this Wavelet transform method applied two-dimensionally to the video signal is executed in a Wavelet transform circuit WT as shown in FIG. 1. The processing to reconstruct the original video signal, i.e., the picture from the divided components is executed in an inverse Wavelet transform circuit IWT as illustrated in FIG. 2.

This wavelet transform circuit WT is composed of a high-pass filter H for separating high-frequency components, a low-pass filter L for separating low-frequency components and a sub-sample unit (indicated by "↓" in the Figure) for effecting sub-sampling by multiplying a clock by ½. For instance, as illustrated in FIG. 3A, a low frequency channel part of a video signal VD for one-field consisting of 720 pixels ×248 lines is recursively divided into components with three layers sequentially in vertical and horizontal directions. By this pieces of coefficient data A0, A1, A2, A3, B1, B2, B3, C1, C2, C3 as shown in FIG. 3B are obtained.

Contrastingly, an inverse Wavelet transform circuit IWT is composed of a high-pass filter H for reconstructing high-frequency components, a low-pass filter L for reconstructing low-frequency components, a sub-sampling unit (indicated by "↑" in the Figure) for effecting sub-sampling by multiplying the clock by 2 and an adder unit. For instance, the coefficient data A0, A1, A2, A3, B1, B2, B3, C1, C2, C3 divided as illustrated in FIG. 3B are reconstructed sequentially in the horizontal and vertical directions. The video signal VD for one field as shown in FIG. 3A is thereby obtained.

Such dividing and reconstructing of the components are attained typically by a finite length non-recursive type digital filter. In the Wavelet transform circuit WT, the low-pass filter L for separating the low-frequency components and the high-pass filter H for separating the high-frequency components are formed respectively of, as illustrated in FIGS. 4A and 4B, delay circuits D for one sample, a multiplier circuit for multiplying a signal delayed by each of the delay circuits D by a predetermined coefficient and an adder circuit for adding the multiplied results.

Further, similarly in the inverse Wavelet transform circuit IWT, the low-pass filter L for reconstructing the low-frequency components and the high-pass filter H for reconstructing the high-frequency components are constructed as illustrated in FIGS. 5A and 5B, respectively.

Video signal coding and decoding modules for coding and decoding the video signal by this Wavelet transform method are, as shown in FIG. 6, constructed. To be specific, in a video signal coding module 10, a video signal S1 inputted is divided into a plurality of components by a dividing circuit 11 consisting of the Wavelet transform circuit WT. The divided components are stored in a memory in the form of coefficient data S2 (A0, A1, A2, A3, B1, B2, B3, C1, C2, C3).

The coefficient data S2 (A0, A1, A2, A3, B1, B2, B3, C1, C2, C3) stored in the memory 12 are, as illustrated in FIGS. 7A and 7B, are blocked by combining the data for one pixel, 2 pixels ×2 lines and 4 pixels ×4 lines according to layers A, B and C. The blocked data are then read in a sequence shown in FIG. 8 and inputted as a coefficient data train S3 to a quantizing circuit (Q) 13.

The quantizing circuit 13 quantizes the coefficient data train S3 with a predetermined quantizing accuracy. Quantized data S4 obtained as a result of this quantization are inputted to a variable length coding circuit (VLC) 14. The variable length coding circuit 14 variable-length-codes the quantized data S4 inputted thereto by a method such as Huffman coding. Coded data S5 acquired as a consequence of this coding are multiplexed with quantization control signals S6 in a multiplexing circuit (MUX) 15.

Output data S7 of the multiplexing circuit 15 are transmitted via buffer memory (BM) 16 for smoothing the coded data quantity in the form of transmission data S8 composed of an output of the video signal coding module 10. At this moment, accumulated quantity data S9 representing an accumulated quantity of data in the buffer memory 16 are inputted to quantization control signal generating circuit (CONT) 17.

The quantization control signal generating circuit 17 creates a quantization control signal S6 indicating a quantization accuracy on the basis of the accumulated quantity S9 and a distribution of in-block electric power in the coefficient data train S3. The circuit 17 then supplies a quantizing circuit 13 with this signal. The quantization accuracy is thus controlled in accordance with the accumulated quantity of the buffer memory 16 and the distribution of the in-block electric power in the coefficient data train S3. The data quantity of the transmission data S8 can be thereby smoothed.

While in the video signal decoding module 20, to start with, transmission data inputted are stored in a buffer memory (BM) 21. An output of the buffer memory (BM) 21 is separated into coded data S12 and a quantization control signal S13 by a de-multiplexing circuit (DMUX) 22.

The coded data S12 thereof are variable-length-decoded into quantization data S14 by means of a variable length decoding circuit (VLD) 23 and inputted to an inverse quantization circuit (IQ) 24. The inverse quantization circuit 24 inverse-quantizes the quantization data S14 in accordance with the quantization control signal S13 inputted from the de-multiplexing circuit 22.

As a result, a coefficient data train S15 outputted from the inverse quantization circuit 24 is inputted to a rearrangement-oriented memory (MEM) 25, wherein the data train S15 turns out coefficient data S16 in an unblocked form shown in FIGS. 7A and 7B. The coefficient data S16 are inputted to a reconstruction circuit composed of an inverse Wavelet transform circuit IWT. The coefficient data S16 are reconstructed and decoded in this reconstruction circuit 26. A video signal S17 consisting of an output of the video signal decoding module 20 is thereby transmitted.

As described above, however, the picture quality often depends on the quantizing operation after being divided in the video signal coding and decoding modules 10 and 20 for coding and decoding the video signals S1 and S27 by the Wavelet transform method. In fact, roughly two kinds of methods are thinkable for the quantizing operation. Any method, however, presents the following problems.

That is, according to the first quantization operating method, a quantization accuracy is prescribed per component obtained by the Wavelet transform. The coefficient data S2 of the entire picture are uniformly quantized and variable-length-coded. With this processing, the distribution of the coefficient electric power differs depending on the video signal S1 inputted. Hence, there arises such a problem that the distribution of erroneous electric power inevitably fluctuates within the picture, with the result that a local deterioration of the image is easily detected.

On the other hand, according to the second quantization operating method, as shown in FIGS. 7A and 7B, the coefficient data S2 of the respective components obtained by the Wavelet transform is sub-blocked. The quantization accuracy is adjusted per sub-block, thus performing the quantization and variable length coding. With this processing, the distortion can be smoothed to some extent. It is, however, difficult to make uniform the distortion detected in the entire picture, for instance, if a fine pattern is provided in only an upper half of the picture, whereas a lower half is flat. This conduces to a problem, wherein the distortions are heavily distributed in the upper half.

Further, according to this method, the quantization coefficients of the respective components are variable-length-coded en bloc. Hence, an error correction having high correcting power is applied to the component exhibiting a high significance, whereas an error correction having low correcting power is applied to the components exhibiting a low significance. It is difficult to actualize an apparatus capable of transmitting a picture having the least picture quality through even ill-conditioned transmitting line by such applications. Additionally it is also difficult to actualize an apparatus, applied to fast-forwarding in, e.g., a video disc recorder, for extracting only the coded data of the components having the high significance from a bit train of the transmission data S8, S19 and simply decoding them.

SUMMARY OF THE INVENTION

In view of the foregoing, an object of this invention is to provide an apparatus for and a method of transmitting a video signal that are capable of further improving a picture quantity when decoding the video signal by dividing it into a plurality of components and reconstructing the video signal by decoding the components.

Another object of the invention is to provide an apparatus for and a method of transmitting a video signal which enables transmission with stable picture quality even against a various changes of the inputted video signals.

Each of the foregoing and additional objects are achieved by the provision of the apparatus for and the method of transmitting a video signal.

At first, according to the present invention, there is provided an apparatus for transmitting a video signal, comprising: a dividing means 11 for recursively dividing only a low frequency channel of an input video signal S1 into a plurality of components; a blocking means 31 for constructing a plurality of blocks S20 corresponding to small area segments of the input video signal from coefficients S2 each belonging to each of the plurality of blocks; a first quantizing means 32 for effecting a first quantization for each of the plurality of blocks S20; a second quantizing means 34 for effecting a second quantization for each of the plurality of components with respect to a first quantization coefficient S22 obtained through the first quantizing means 32; and a variable length coding means 35 for variable-length-coding a second quantization coefficient S24 obtained through the second quantizing means 34.

At second, according to the present invention, there is provided a video signal transmitting method of recursively dividing only a low frequency channel of a input video signal S1, effecting a quantization and variable length coding thereof and making a transmission thereof. This method comprises the steps of: constructing a plurality of blocks S20 corresponding to small area segments of the input video signal S1 from coefficients S2 each belonging to each of the plurality of components and performing a first quantization per the block S20; and effecting a second quantization for each of the plurality of components with respect to a first quantization coefficient S22 obtained by the first quantization.

Further, according to the present invention, there is provided a video signal transmitting apparatus for restoring a video signal S40 from transmission data SD30 consisting of first and second quantization control signals S31, S32, the video signal transmitting apparatus comprising: a variable length decoding means 42 for variable-length-decoding the coded video data S30 in the transmission data SD30; a first inverse quantizing means 43 for inverse-quantizing an output S33 of the variable length decoding means 42 on the basis of the first quantization control signal S32 and outputting a first inverse quantization coefficient S34; a second inverse quantizing means 45 for inverse-quantizing the first inverse quantization coefficient S34 on the basis of the second quantization control signal S31 and outputting a second inverse quantization coefficient S36; a first rearranging means 46 for rearranging the second inverse quantization coefficient S36 according to a plurality of components; and a reconstructing means 26 for reconstructing the video signal S40 from a decoding coefficient S37 partitioned into the plurality of components.

Further, according to the present invention, there is provided a video signal transmitting method of restoring a video signal S40 from transmission data SD30 consisting of coded video data S30 transmitted and first and second quantization control signals S32, S31. This method comprises the steps of: variable-length-decoding the coded video data S30 in the transmission data SD30 and at the same time effecting a first inverse quantization on the basis of the first quantization control signal S23 with respect to a decoded coefficient S33 that has been variable-length-decoded; performing a second inverse quantization of a first inverse quantization coefficient S34 obtained by the first inverse quantization conducted on the basis of the second quantization control signal S31; making a first rearrangement to rearrange second inverse quantizaiton coefficients S36 obtained by the second inverse quantization according to the plurality of components; and restoring the video signal S40 from decoded coefficients S37 rearranged according to the plurality of components.

The above, and other objects, features and advantages of the present invention will be apparent in the following detailed description of preferred embodiments when read in conjunction with the accompanying drawings, in which like reference numerals are used to identify the same or similar parts in the several views.

BRIEF DESCRIPTION OF THE DRAWINGS

In the accompanying drawings:

FIGS. 7A and 7B are schematic diagrams for explanation of blocking of the coefficients thereof;

FIGS. 12A, 12B, 12C, and 12D are schematic diagrams of assistance in explaining characteristics of quantizers of luminance signals by a first quantizing method thereof;

FIGS. 13A, 13B, 13C, and 13D are schematic diagrams of assistance in explaining the characteristics of the quantizers of the chrominance signals by the first quantizing method thereof;

FIG. 14 is a table of assistance in explaining a transmission sequence and a second quantizing method thereof;

DETAILED DESCRIPTION OF THE EMBODIMENTS

Figure 6A:
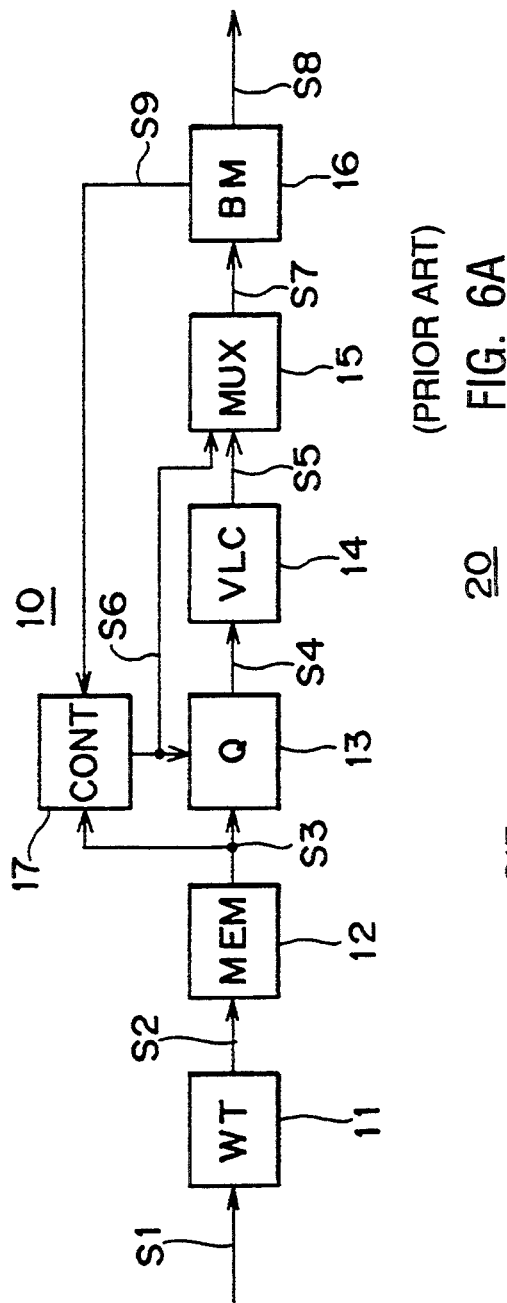
FIGS. 6A and 6B are block diagrams illustrating constructions of conventional image signal coding and decoding modules.
Figure 6B:
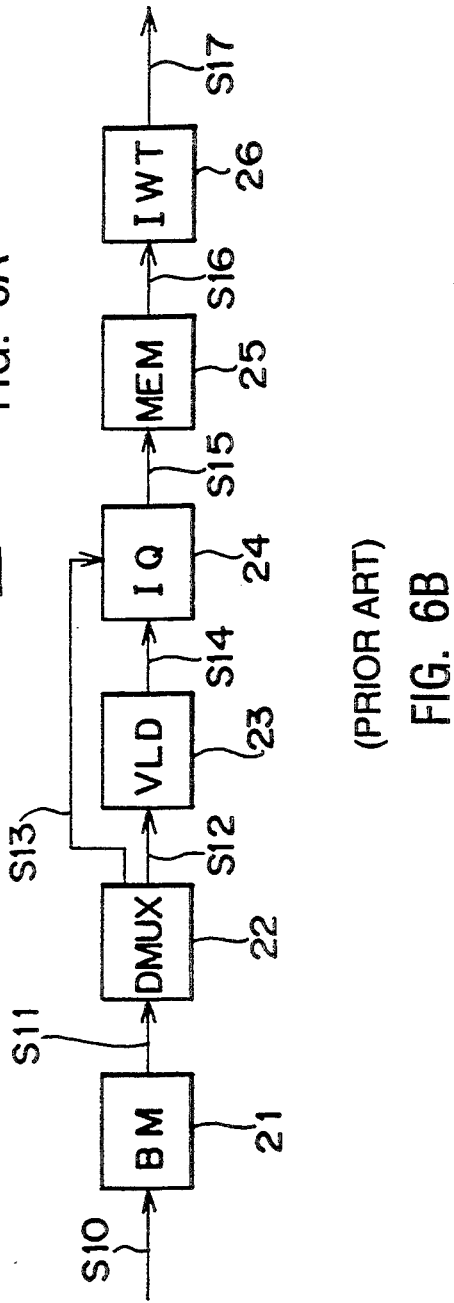
Figure 8:
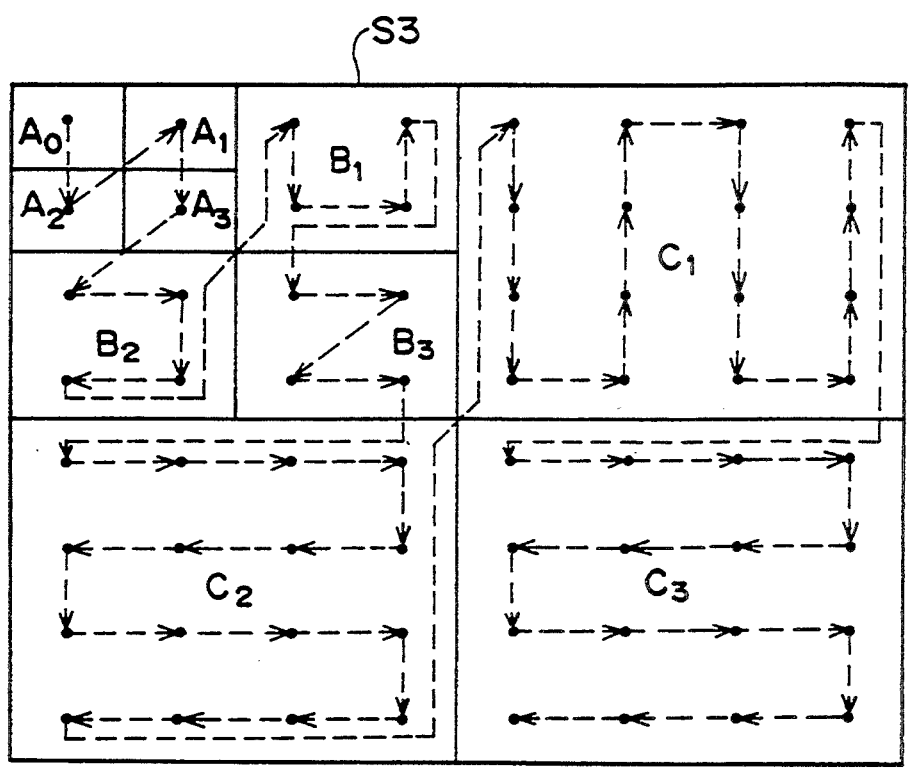
FIG. 8 is a schematic diagram of assistance in explaining the quantization and the transmitting sequence of the blocks.
Figures 9A, 9B:
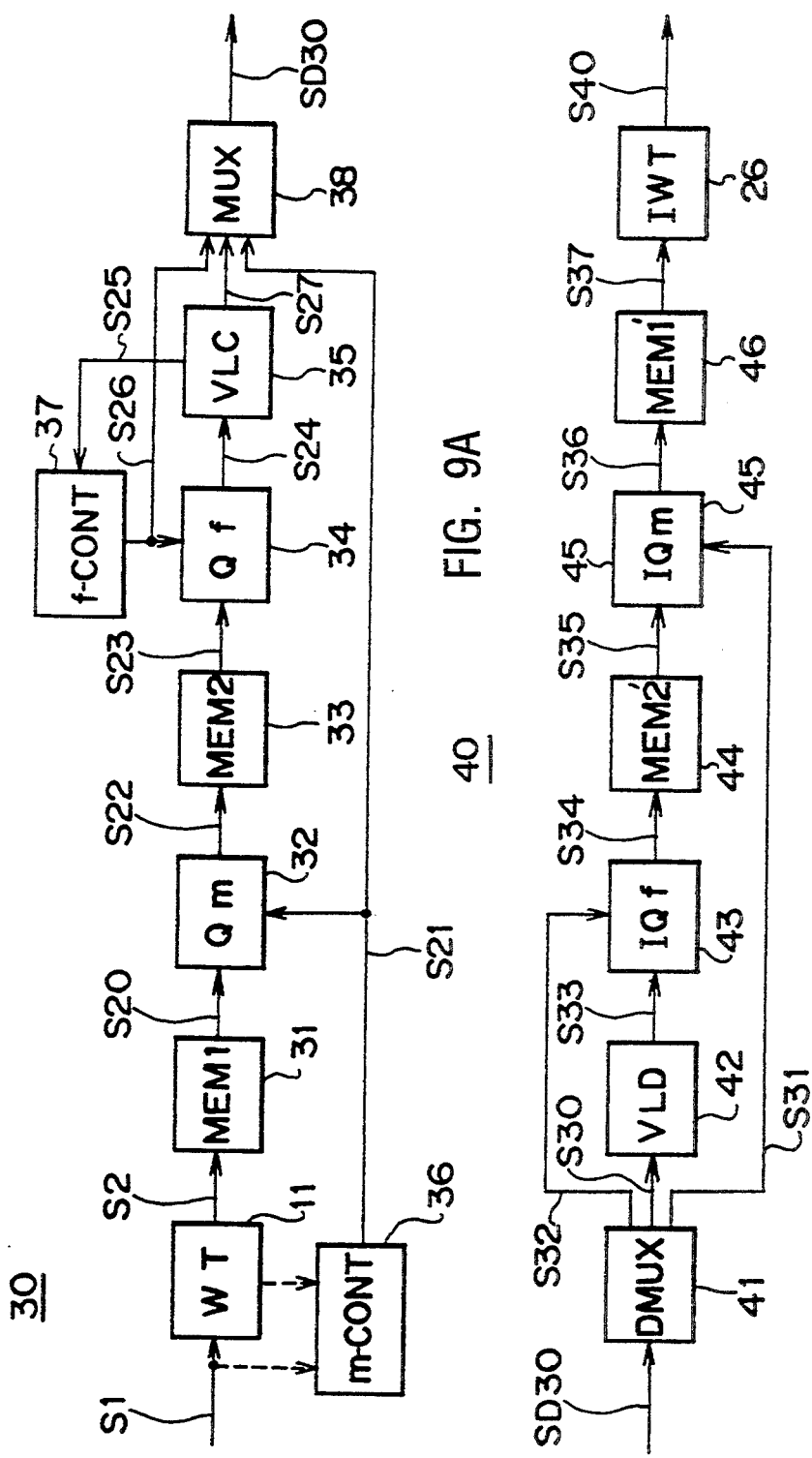
FIGS. 9A and 9B are block diagrams showing one embodiment of video signal coding (FIG. 9A) and decoding (FIG. 9B) modules as a video signal transmitting apparatus according to the present invention.

Preferred embodiments of this invention will be described with reference to the accompanying drawings:

Referring to FIGS. 9A and 9B in which the units corresponding to those in FIGS. 6A and 6B are designated with the same numerals, the numeral 30 designates a video signal coding module according to the present invention. A plurality of components obtained by dividing a video signal inputted are at first rearranged by quantization based on a first quantizing method. Thereafter, these components are requantized by a second quantizing method controlled separately from the first quantizing method. For this reason, as compared with the conventional configuration, there are additionally provided two quantizing circuits controlled by control signals generated respectively in separate control circuits and a rearrangement memory interposed therebetween, whereas a buffer memory for smoothing a coded data quantity is omitted.

More specifically, the video signal coding module 30 is constructed of: a dividing circuit (WT) 11 for a Wavelet transform or the like; a first memory (MEM1) 31 used for blocking; a first quantizing circuit (Qm) 32; a second memory (MEM2) 33 employed for rearranging coefficients in accordance with a second quantization sequence; a second quantizing circuit (Qf) 34; a variable length coding circuit (VCL) 35; a quantization control signal generating circuit (m-CONT) 36 for generating a circuit quantization control signal; a quantization control signal generating circuit (f-CONT) 37 for generating a second quantization control signal; and a multiplexing circuit (MUX) 38 for multiplexing the first and second quantization control signals as well as the variable length coded data.

Correspondingly, a video signal decoding module 40 is constructed of: a de-multiplexing circuit (DMUX) 41 for de-multiplexing the variable length coded data and the first and second quantization control signals form the data transmitted; a variable length decoding circuit (VDC) 42; a second inverse quantizing circuit (IQf) 43 making an inverse action to the second quantizing circuit 33; memories (MEM2') 44 and (MEM1') 46 respectively effecting a rearrangement reversal to that of the first and second memories 31 and 33; a first inverse quantizing circuit (IQm) 45 making an inverse action to the first quantizing circuit 32; and a reconstruction circuit 25 for a Wavelet inverse transform, etc..

Figure 1:
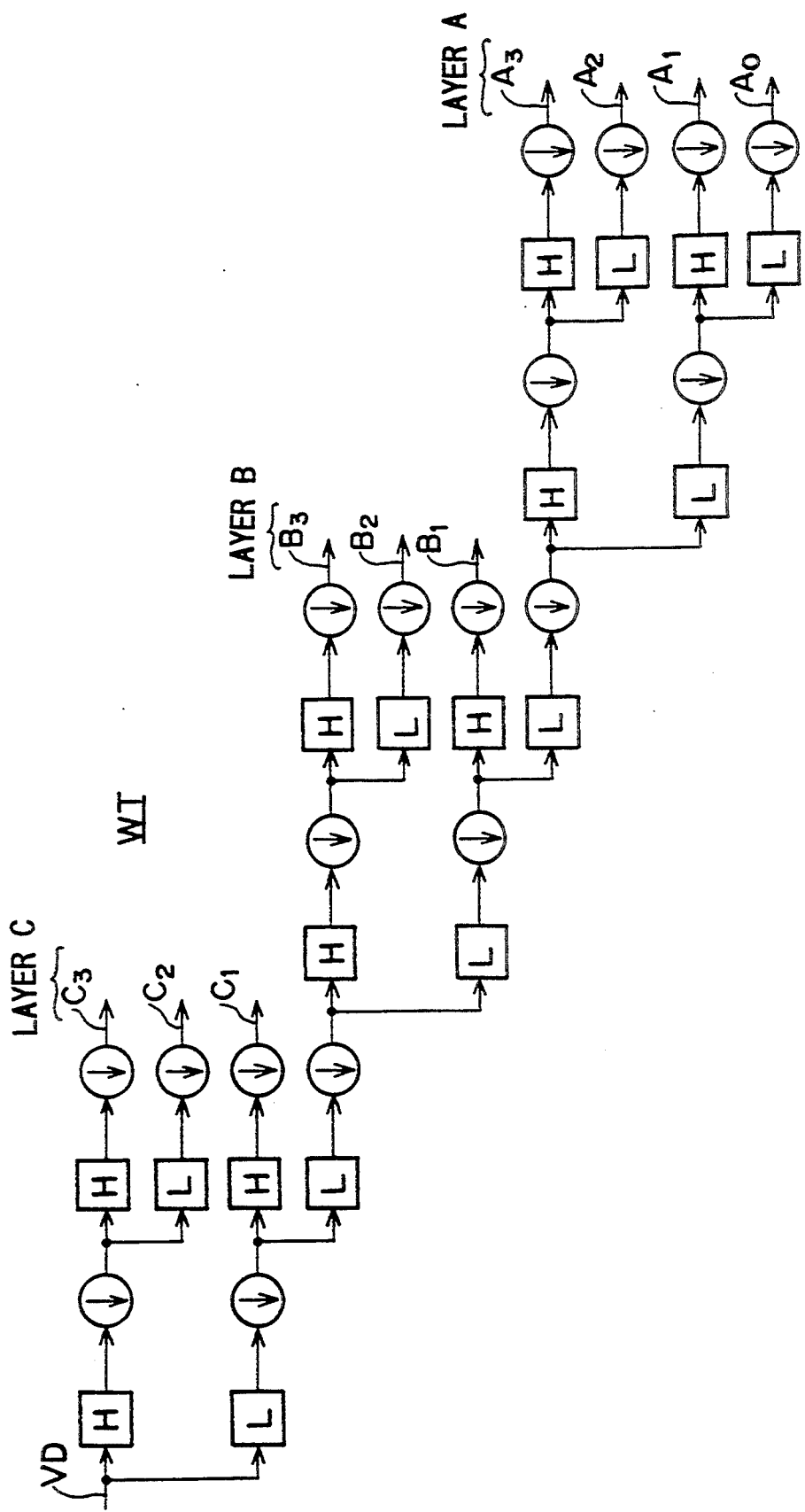
FIG. 1 is a connection diagram showing a construction of an ordinary Wavelet transform circuit.
Figure 2:
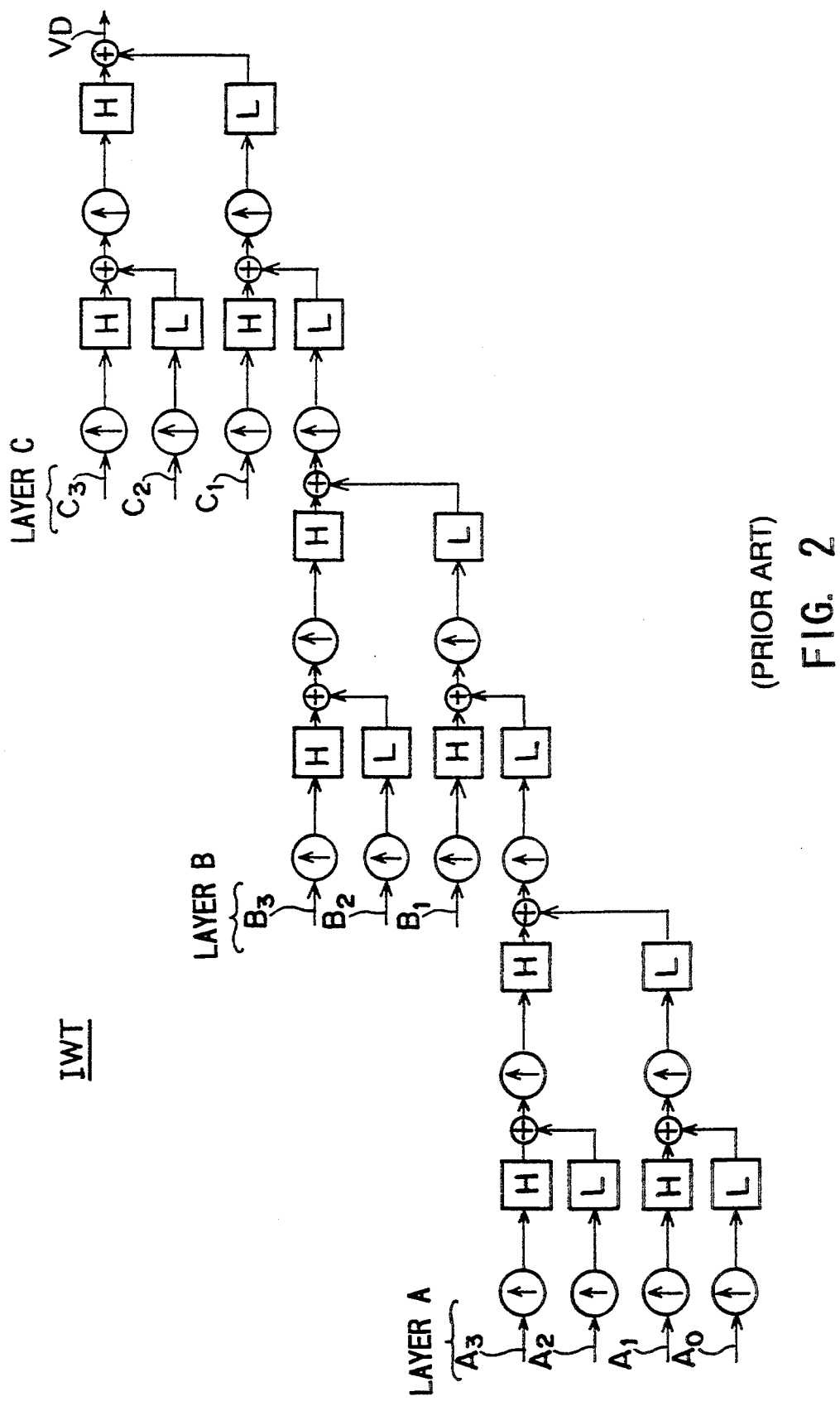
FIG. 2 is a connection diagram showing a construction of an ordinary inverse Wavelet transform circuit.
Figure 3A:
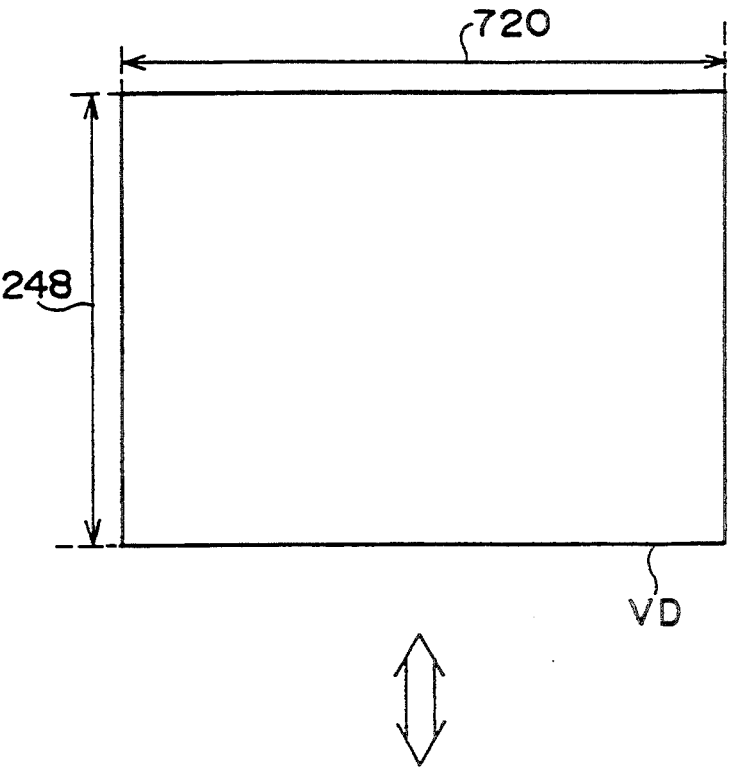
FIGS. 3A and 3B are schematic diagrams for explanation of two-dimensional dividing of the video signal based on the Wavelet transform and a reconstruction.
Figure 3B:
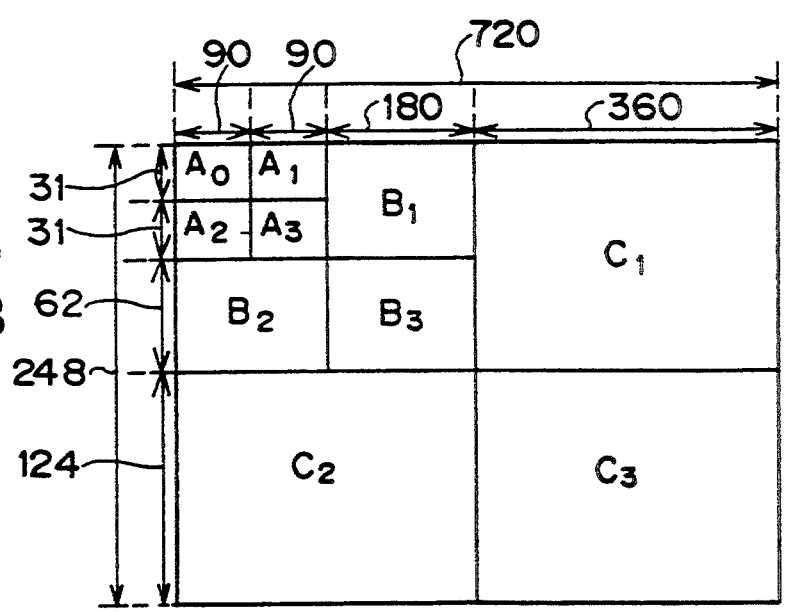
Figure 4A:
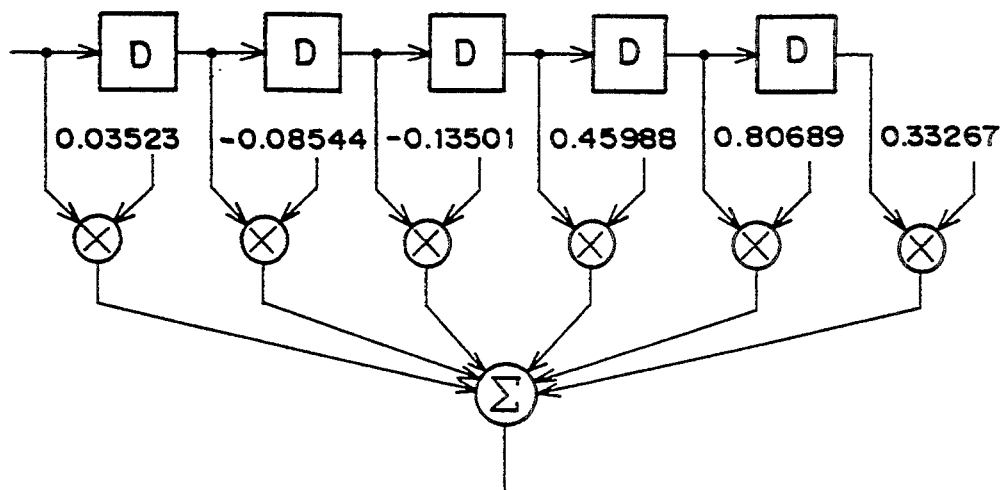
FIGS. 4A and 4B are connection diagrams showing a construction of a finite length digital filter for actualizing the Wavelet transform.
Figure 4B:
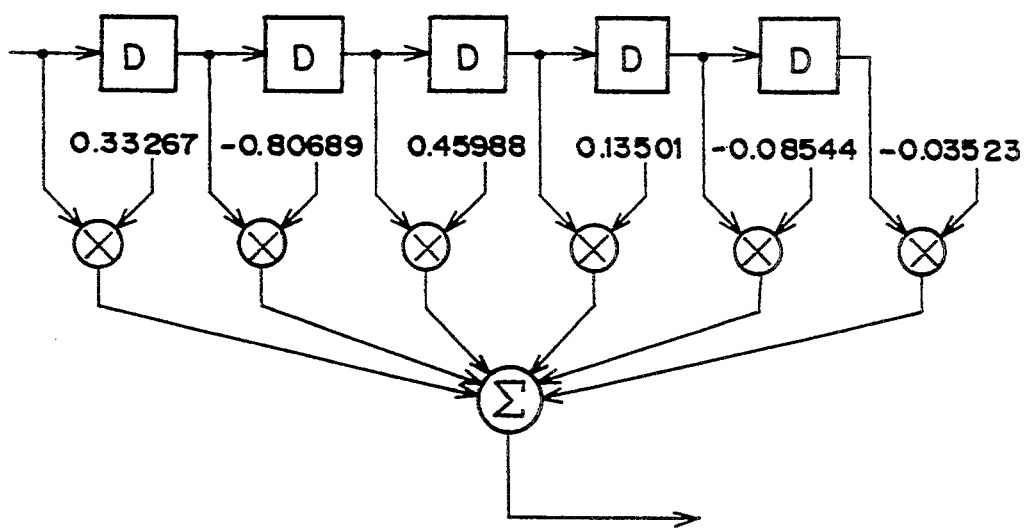
Figure 5A:
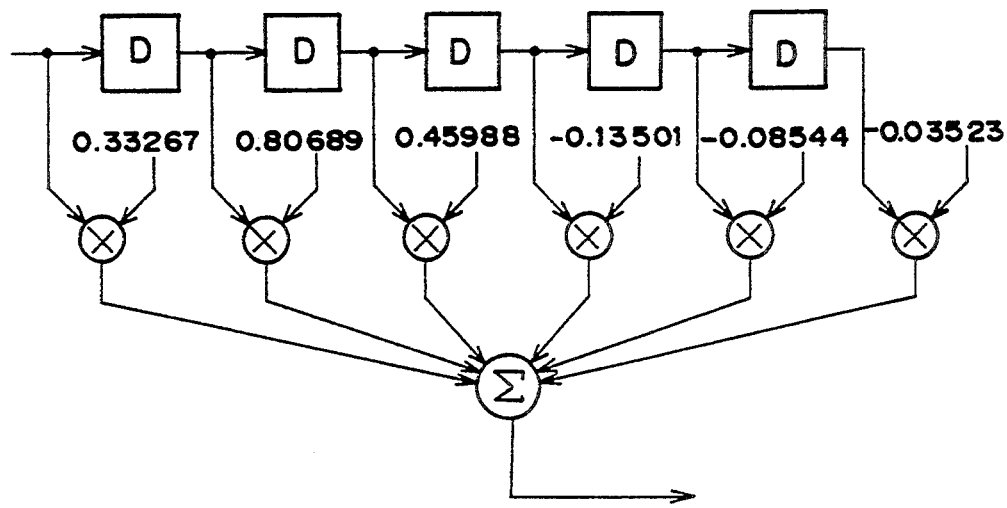
FIGS. 5A and 5B are connection diagrams showing a construction of the finite digital filter for actualizing an inverse Wavelet transform.
Figure 5B:
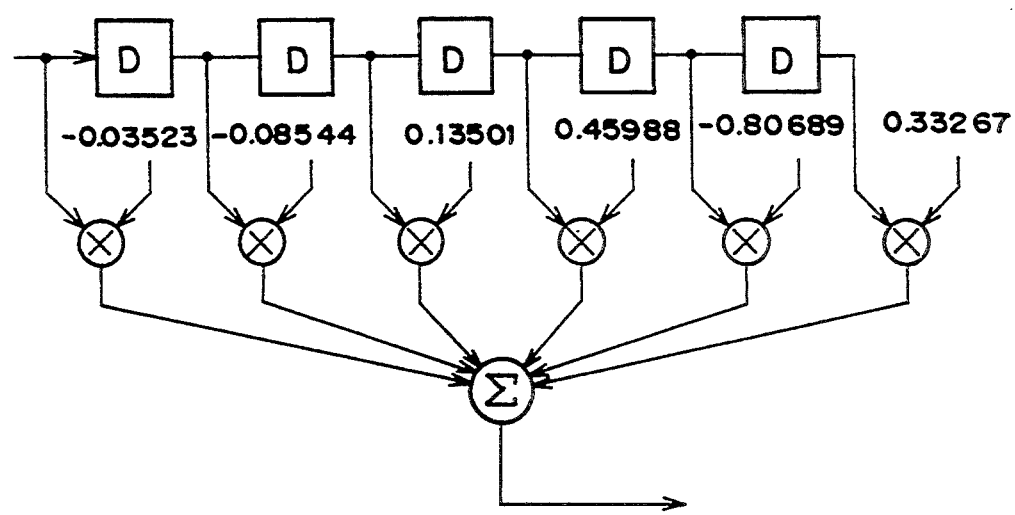
Figure 10:
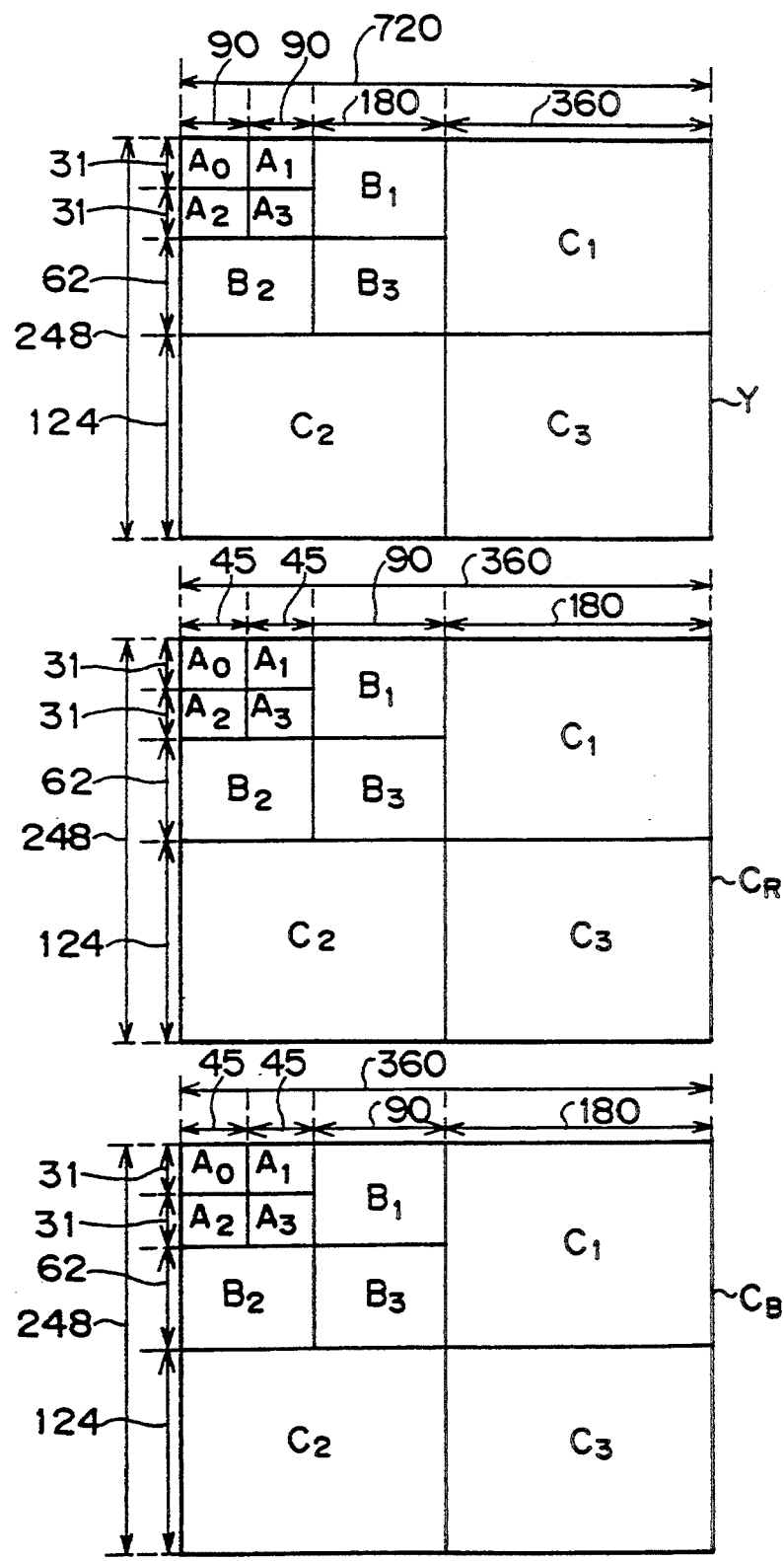
FIG. 10 is a schematic diagram of assistance in explaining coefficient fields based on a Wavelet transform according to the present invention.

In a video signal coding module 10, a video signal S1 inputted is, as done similarly in FIG. 3, divided by a dividing circuit 11 into a plurality of components A0, A1, A2, A3, B1, B2, B3, C1, C2, C3. These components are stored in the form of coefficient data S2 in the first memory 31. Note that the video signal S1 is composed of a plurality of component signals each having a different sampling frequency in accordance with a luminance signal Y and chrominance signals CR and CB as in, e.g., a CCIR recommendation 601, and in this case also, as illustrated in FIG. 10, the Wavelet transform is effected for each of component signals Y CR, CB.

Figure 11:
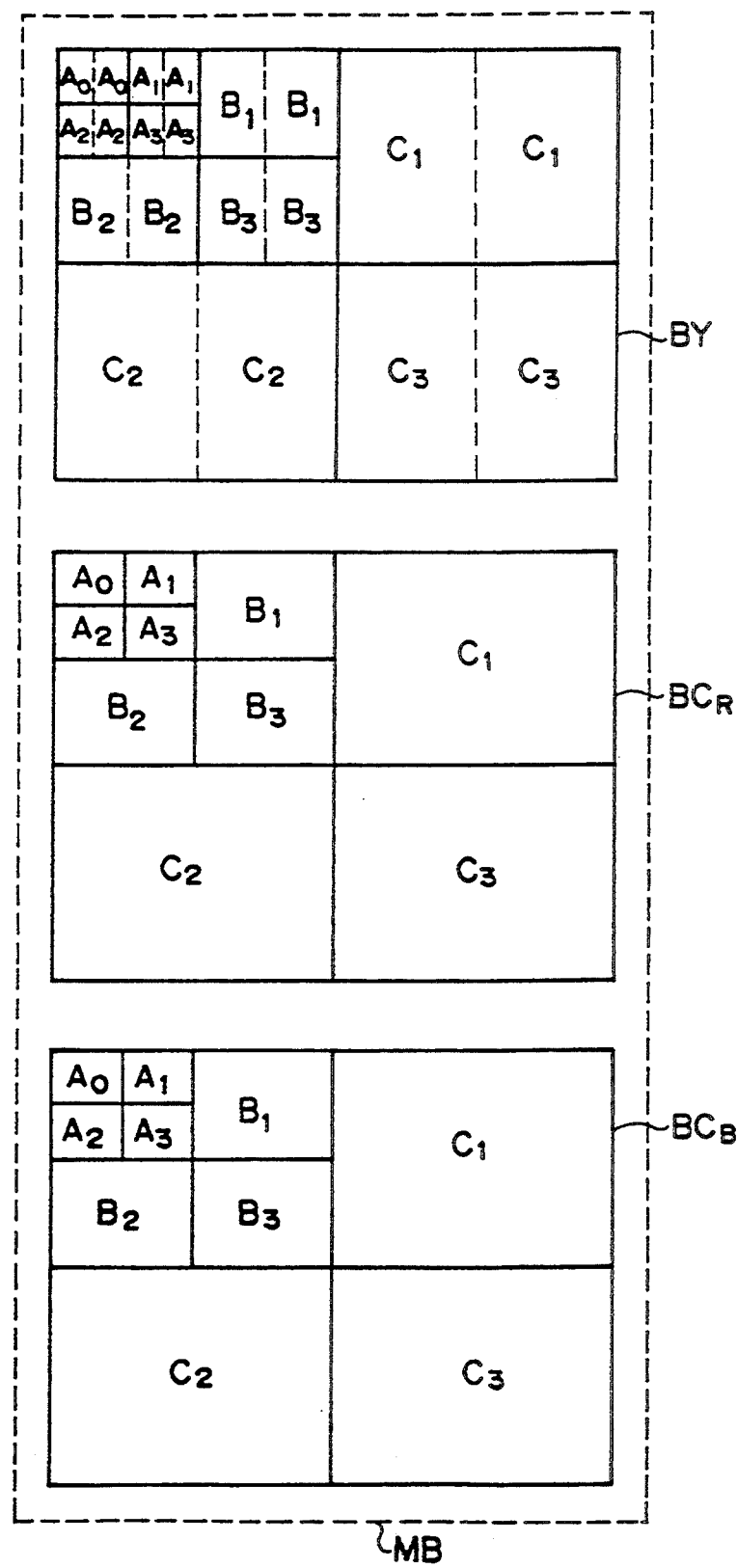
FIG. 11 is a schematic diagram of assistance in explaining a method of constructing blocks thereof and a marco block.
Figures 12A, 12B, 12C, 12D:
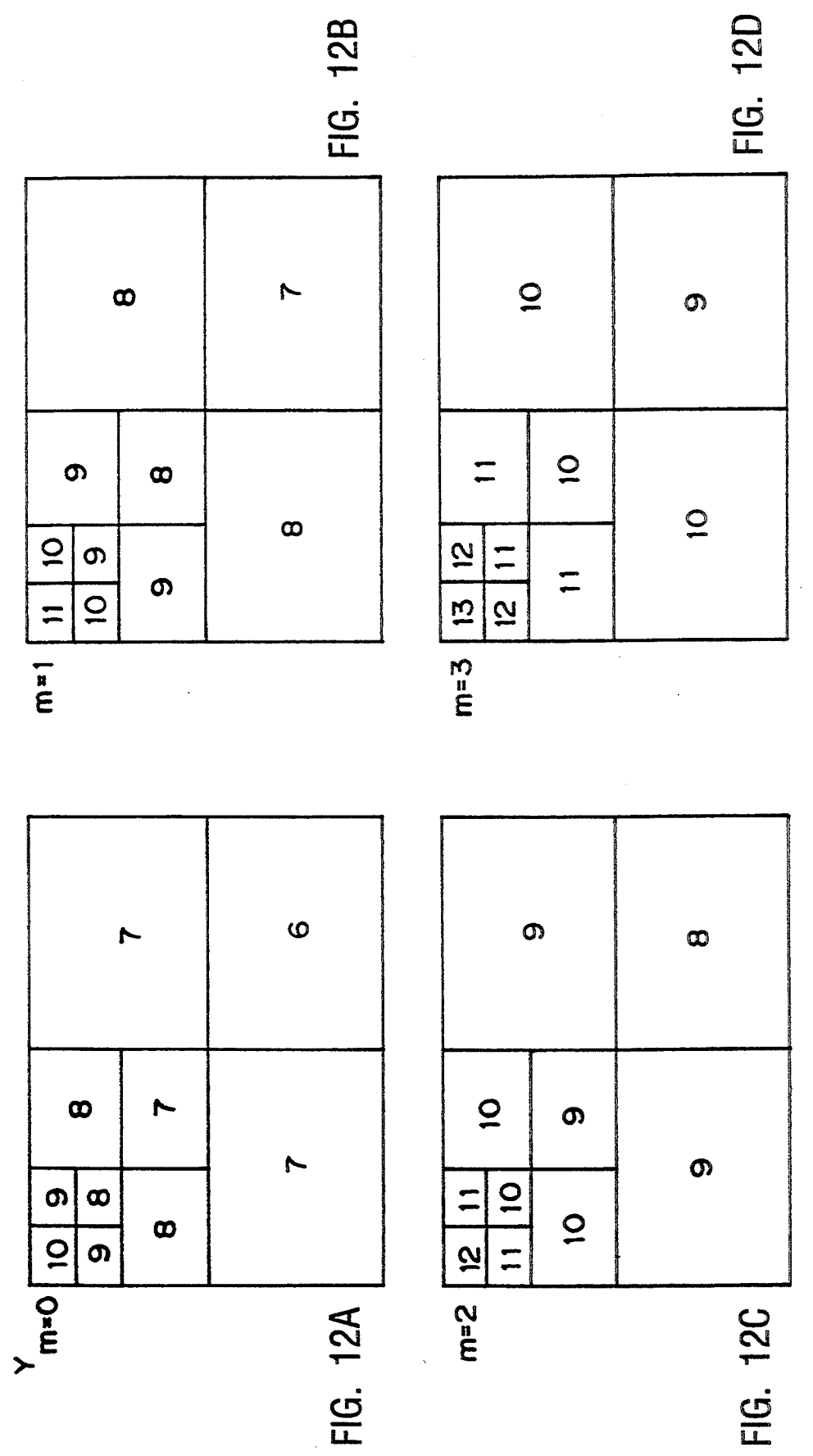
Figures 13A, 13B, 13C, 13D:
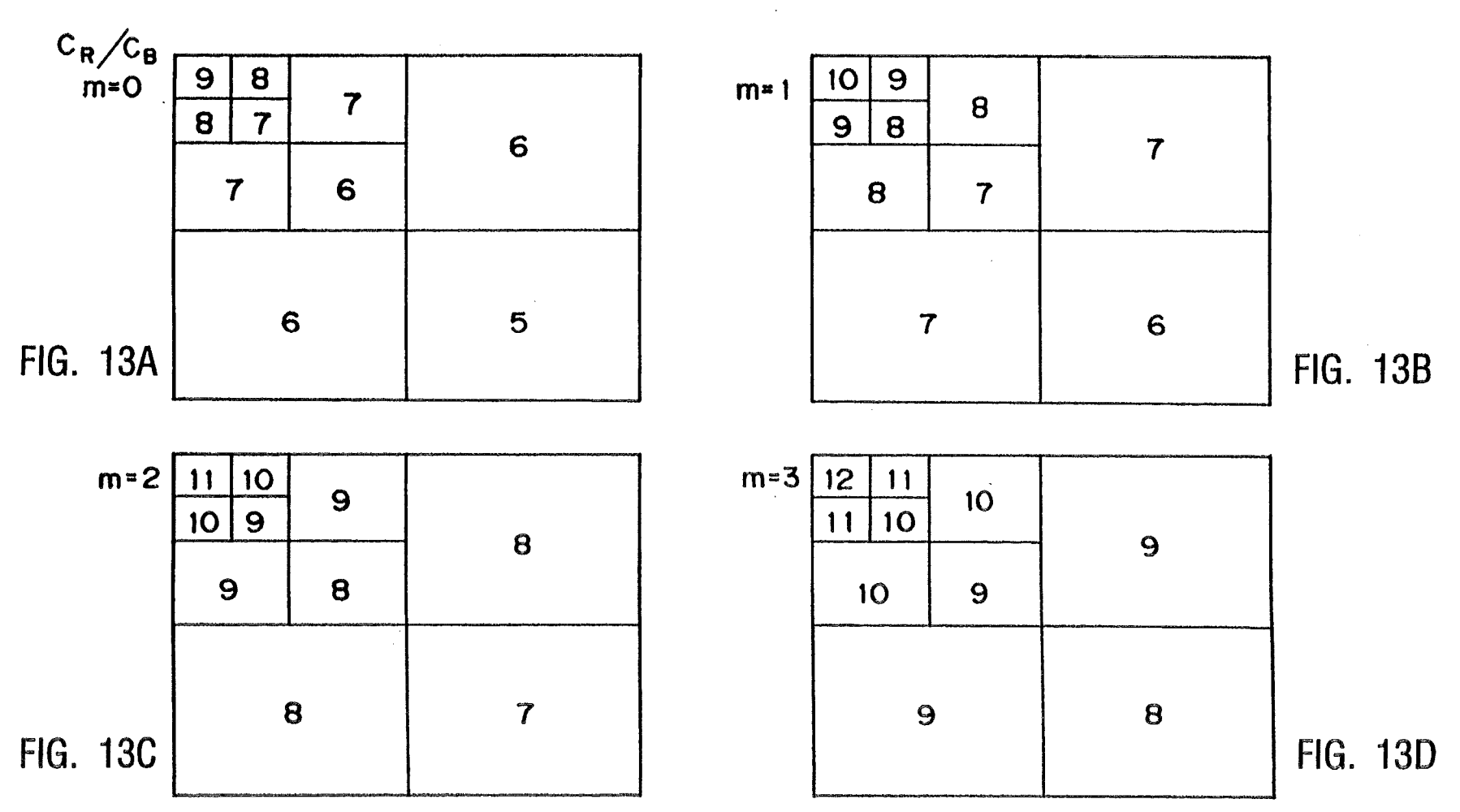

There are read from the first memory 31 the coefficient data S2 in the form of a macro block (MB) S20 as shown in FIG. 11 per block corresponding to each of small area segments of the video signal S1. The macro block S20 is then inputted to the first quantizing circuit 32. The first quantizing circuit 32 selectively uses four types of quantizers of m=0 to 3 with combinations of respective quantization bit numbers as shown in FIGS. 12A–12D and 13A–13D in accordance with the first quantization control signals S21 transmitted from the first quantization control signal generating circuit 36.

In fact, switching control of these quantizers is performed to select the quantizer indicated by M=3 in a portion wherein, e.g., flat and edge portions coexist in the input video signal S1 with a distortion of the flat portion being conspicuous and the quantizer of M= 0 in a portion wherein components on a high-frequency side are small in quantity while the electric power is concentrated on the low-frequency side. For this reason, the first quantization control signal generating circuit 36 is constructed to generate first optimum quantization control signals S21 by a distribution of the electric power of, e.g., the coefficient data S2 and a dispersion of the video signals S1 inputted.

Coefficient data S22 obtained when quantized by the first quantizing circuit 32 are rearranged into coefficient data S23 according to the transmitting sequence in the rearrangement-oriented second memory 33. The coefficient data S23 are then inputted to the second quantizing circuit 34. The second quantizing circuit 34 performs the quantization according to the transmitting sequence. Further, the priority in this transmitting sequence is given generally to the low-frequency side having a higher significance.

In the case of this embodiment, for instance, the transmitting sequence and the second quantizing method are expressed by relationship shown in FIGS. 13A–13D. To be more specific, according to the second quantizing method, the data are transmitted directly to the variable length coding circuit 35 as quantization data S24 without being quantized up to the transmitting sequence [3]. Variable length coding is effected therein. At this time, the second quantization control circuit 37 selects a quantization characteristic of the transmitting sequence [4] from weights (1, ⅞, 6/8, ⅝) referring to a coded data quantity S25 in the variable length coding circuit 35. This quantization characteristic is inputted as a second quantization control signal S26 to the second quantizing circuit 34.

As a result, the second quantizing circuit 34 effects the quantization by multiplying the coefficient data S23 by the weight that the second quantization control signal S26 designates. The quantization data S24 obtained as a consequence of this are outputted to the variable length coding circuit 35. The same operations are repeated in this manner from the transmitting sequence [4] onward. As a result, it is possible to perform the transmission with a substantially uniform coded data quantity per picture of the video signal S1.

Further, in the second quantizing circuit 34, there is a likelihood of an excess over a predetermined transmitting information quantity consisting of those for, e.g., one-frame period of one picture as a data quantity in which the coded data quantity is predetermined before transmitting all the data up to the transmitting sequence of [13]. In this case, however, when reaching the predetermined transmitting information quantity, the transmission is forcible stopped up to the components that have already been transmitted. The operation shifts to the quantization of the next picture, in this instance, the video signal decoding module 40 is incapable of reconstruction from all the components. However, the transmission is performed generally centering around the low-frequency components having the high significance. The reconstruction with a relatively small amount of deterioration by use of the highly significant components is therefore attainable.

Figure 15:
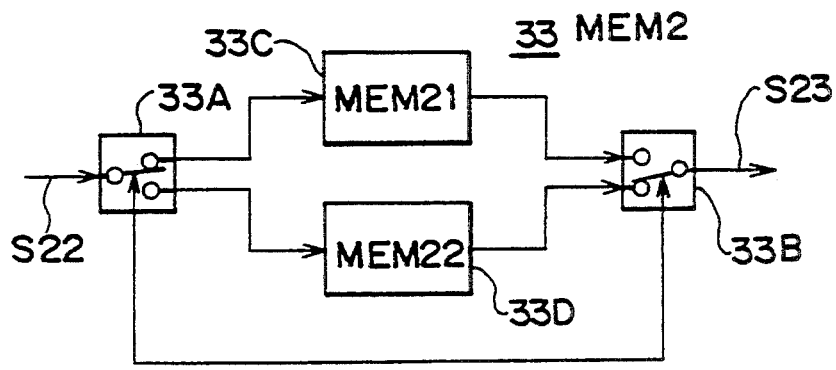
FIG. 15 is a block diagram illustrating a construction of a second memory in the video signal coding module shown in FIG. 9.

In fact, as best shown in FIG. 15, for actualizing such processing, the second memory 33 involves the use of an input switching circuit 33A, an output switching circuit 33B that act complementarily and a so-called double buffer based memory unit consisting of a combination of two memories (MEM21 and MEM22) 33C and 33D. In fact, when the coefficient data S22 are written to the memory 33C, the coefficient data S23 are read from the memory 33D. The coefficient data S22 of all the components are written to the memory 33C with a frame period. A write speed at this time is constant. Further, the speed of reading from the memory 33D is not constant because of reading the next coefficient every time one coefficient is processed in the variable length coding circuit 35.

Note that a truncation of transmission of the components implies a termination of writing to the memory 33C before reading all the coefficient data S23 written to the memory 33D. In this case, switches 33A and 33B are inverted, and the coefficient data S22 are written to the memory 33D. At this time, the coefficient data S23 are read from the memory 33C.

Namely, when finishing the writing into the memory 33C, the writing into the memory 33D is started regardless of remaining unread from the memory 33D. Reading from the memory 33C are transmitted to the second quantizing circuit 34. Thus, the transmission can be easily performed to shift to the quantization for the next picture when reaching, for instance, the predetermined transmitting information quantity consisting of those for the one-frame period.

The variable length coding circuit 14 performs variable-length-coding of the quantization data S24 transmitted from the second quantizing circuit 34. Coded data S27 obtained as a result of this are outputted to the multiplexing circuit 15. This variable length coding involves the use of a coding method based on a combination of, e.g., ordinary Huffman codes and run length coding suitable to a case where a coefficient of a value [0] is continuous.

In this video signal coding module 30 herein, the coefficient data S22 are read from the second rearrangement-oriented memory 33 at the variable length coding speed, i.e., the speed at which the coded data S27 are transmitted to the multiplexing circuit 38. This eliminates the necessity for the buffer memory, generally provided posterior to the variable length coding circuit 35, for smoothing the coded data quantity. This is equivalent to such an operation that the rearrangement and smoothing of the coded data quantity are actualized by a pair of memories used in combination.

Thereafter, the multiplexing circuit 38 multiplexes the coded data S27 outputted from the variable length coding circuit 35 and the first and second quantizing control signals S21 and S26. Synchronous signals are added thereto, whereby the data are transmitted in the form of transmission data SD30 consisting of the outputs of video signal coding module 30.

On the other hand, the transmission data SD30 are inputted to the de-multiplexing circuit 41 in the video signal decoding module 40. The de-multiplexing circuit 41 de-multiplexes variable length coded data S30 and quantization control signals S31 and S32 with reference to the synchronous signals added to the transmission data SD30. The variable length coded data S30, and the quantization control signals S31 and S32 are data respectively equal to the variable length coded data S27 and the quantization control signals S21 and S26 in the video signal coding module 30.

The coefficient data S34 consisting of the output from the first inverse quantizing circuit 43 are outputted to the second inverse quantizing circuit 23A as blocked coefficient data S35 via the first rearrangement-oriented memory 44. In fact, the first memory 44 judges whether or not the component is the one with the truncation of transmission supervising a write address in addition to the rearrangement. When reading the truncated component, this component is forcibly set to [0].

Figure 16:
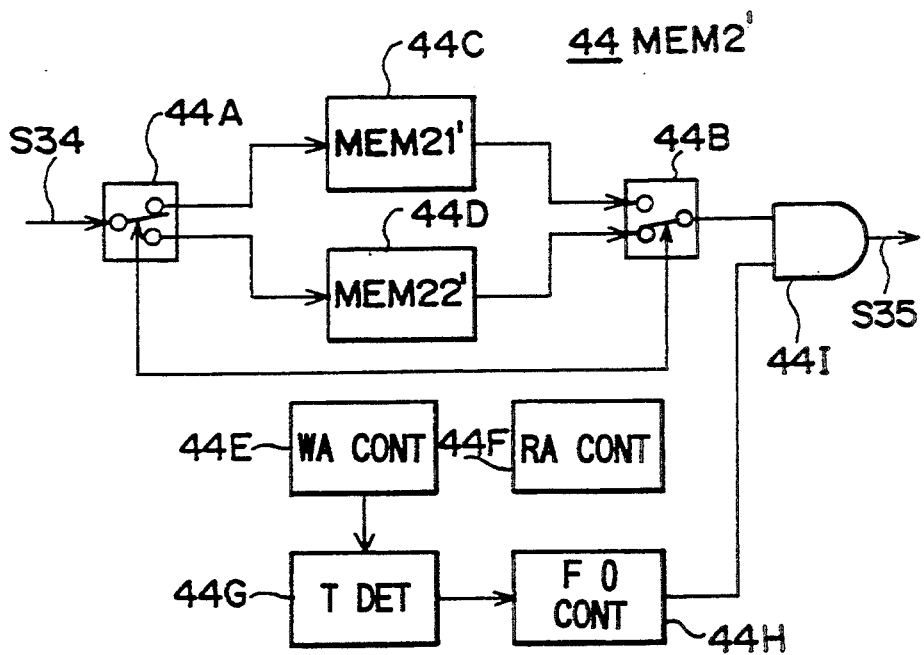
FIG. 16 is a block diagram showing a construction of a first memory in the video signal decoding module shown in FIG. 9.

For realizing this, as in the case of the second memory of the video signal coding module 30, the first memory 44 involves the use of, as shown in FIG. 16, an input switching circuit 44A and an output switching circuit 44B which act complementarily and a double buffer based memory consisting of a combination of two memories (MEM21' and MEM22') 44C and 44D. In the case of this memory 44, writing and reading are simultaneously started under the control of a write address control circuit 44E and a read address control circuit 44F, respectively.

The writing unit effects writing into, e.g., the memory 44C each time the coefficient data S33 is outputted from the variable length decoding circuit 42. Note that this writing speed is not constant. Further, the reading unit reads the data for one-frame with a frame period, and hence the reading speed is constant except for vertical and horizontal blank periods.

The switching circuits 44A and 44B are switched over when finishing the reading from the memory 44D. At this time, a truncation detecting circuit 44G supervises an address of the writing unit, i.e., the memory 44C. It is thus possible to judge both whether the transmission is truncated or not and which component to truncate. Hence, the information thereof is sent to a forcible 0-control circuit 44H. When reading the truncated component with reference to an address of the reading unit, i.e., the memory 44D, a gate 44I is closed. All the components after the one truncated midway can be thereby set to 0.

The second inverse quantizing circuit 45 performs an inverse quantization corresponding to the first quantizing circuit 32 in the video signal coding module 30 in accordance with the quantization control signal S31. A decoding coefficient S36 obtained as a result of this is outputted to a rearrangement-oriented second memory 46. The decoding coefficient read from the rearrangement-oriented second memory 46 is decoded by the reconstruction circuit 25 for the inverse Wavelet transform, etc.. A video signal S40 acquired as a consequence of this is transmitted as an output of the video decoding module 40.

According to the construction described above, the block is constructed from the coefficients obtained by dividing the components of the video signal. The first quantization is conducted per block to prevent a local deterioration in picture quality. At the same time, the second quantization is carried out per component with respect to the quantized result. The quantization is effected per component so as not to cause nonuniformity in the picture on the whole, thus controlling the coded data quantity. It is thereby feasible to realize the video signal transmitting apparatus and method capable of transmitting the video signal with a stable quality by performing the well-balanced control of the coded data quantity and the picture quality per picture.

Further, according to the construction described above, if the video signal S1 is a digital component signal on the occasion of the first quantization, the coefficient blocks are constructed to equalize the number of the coefficient blocks of the luminance signal Y to the number of the coefficient blocks of the chrominance signals CR and CB within the picture and to make coincident the small area segments on the pictures where the two types of signals are reconstructed. The two types of signals are uniformly easily controllable. Further, quantization accuracies of the coefficient blocks of the plurality of components are thus controlled en bloc, thereby realizing the video signal transmitting apparatus and method capable of simplifying the configuration and reducing the transmission quantity of the control information.

Moreover, according to the construction described above, the respective components divided in the second quantization undergo the quantization and variable length coding from the low frequency channel having the high significance. The quantization accuracy of the components to be processed next is set in accordance with the coded data quantity at the end of processing the respective components. It is possible to attain the video signal transmitting apparatus and method capable of equalizing the coded data quantity predetermined per picture to the actual coded data quantity while keeping the uniformity of the quantization of the respective components on the entire picture.

Based further on the construction discussed above, the respective components divided in the second quantization undergo the quantization and variable length coding in the sequence from those having the higher significance. If the coded data quantity during an execution of processing the respective components or at the end of processing the same exceeds the coded data quantity predetermined per picture, the transmission of the relevant components is made ineffective. It is thus possible to realize the video signal transmitting apparatus and method capable of avoiding a break-down of the system and making uniform influences on the picture quality per picture.

Based still further on the construction described above, generally the coded data quantity is smoothed during the second quantization and variable length coding. Therefore, the buffer memory provided posterior to the variable length coding circuit is omitted. The rearrangement-oriented memory provided anterior to the second quantizing means serves as a function of the buffer memory. It is therefore possible to realize the video signal transmitting apparatus and method capable of equipmentization and facilitating the control.

Note that the embodiment discussed above has dealt with the case where the video signal is divided into the plurality of components by the Wavelet transform method. The present invention is not, however, limited to this. The video signal may be divided into the plurality of components by other methods such as side band coding, etc.. In short, the same effects as those in the embodiment discussed above are obtainable when using the method of recursively dividing only the low frequency channel of the video signal into the plurality of components. Further, in regards to the dividing number and directions, the video signals are sequentially divided with three layers in the horizontal and vertical directions. The dividing number and directions are not limited to those mentioned herein. A variety of numbers and directions may be selected as the necessity arises.

Further, the embodiment described above has dealt with selecting the four types of quantizers in which the quantizing bits are combined when quantized by the first quantizing method. The number of the quantizers is not, however, limited to this. Two, three and further five or more types of the quantizers may be selected according to the necessity. The combination of the quantizing bit numbers may be set in many ways.

Additionally, in the embodiment described above, the quantization is performed by multiplying the respective components by the weights of "1", "$\frac{7}{8}$", "6/8", "5/8", "$\frac{3}{4}$", "2/4", "$\frac{1}{4}$" when quantized by the second quantizing method. The weight values are not, however, limited to these values. The same effects as those in the embodiment discussed above can be acquired even by setting a variety of values.

Further, in accordance with the embodiment described above, the transmission is forcibly ended up to the components that have already been transmitted when the coded data quantity reaches the predetermined transmitting information quantity by use of the double buffer based memory when quantized by the second quantizing method. The operation then shifts to the quantization for the next picture. However, writing to and reading from the memory may be controlled by supervising the coded data quantity with the variable length coding circuit or the like instead of the double buffer based memory.

Furthermore, the embodiment described above has dealt with the case where the video signals constituting a motion picture are coded and decoded. According to this invention, however, the same effects as those in the above-described embodiment can be attained even when applied to coding and decoding video signals constituting a still picture.

Further, the above-stated embodiment has dealt with the case where this invention is applied to the transmission of the video signal to the remote place as in the video conference system. This invention is not, however, limited to this. The present invention is suitable for applications widely to a video signal transmitting apparatus and method of transmitting high quality video signals between broadcasting stations, digitally recording and reproducing the high quality video signals on and from a video tape recorder and a video disc recorder and the like.

While specific embodiments of the invention have been shown and disclosed, it is to be understood that numerous changes and modifications may be made by those skilled in the art without departing from the scope and intent of the invention.

What is claimed is:

1. An apparatus for transmitting a video signal, comprising:
   a dividing means for recursively dividing only a low frequency channel of an input video signal into a plurality of components;
   a blocking means for constructing a plurality of blocks corresponding to small area segments of the input video signal from coefficients each belonging to each of the plurality of blocks;
   a first quantizing means for effecting a first quantization for each of the plurality of blocks;
   a second quantizing means for effecting a second quantization for each of the plurality of components with respect to a first quantization coefficient obtained through the first quantizing means; and
   a variable length coding means for variable-length-coding a second quantization coefficient obtained through the second quantizing means.

2. The apparatus for transmitting a video signal according to claim 1, wherein:
   the input video signal consists of a plurality of component signals each having a different sampling frequency;
   the blocking means forms the plurality of blocks to equalize areas of the small area segments of the input video signal that correspond to the plurality of component signals; and
   the first quantizing means sets the first quantization accuracy for each of the blocks.

3. The apparatus for transmitting a video signal according to claim 1, wherein:
   the input video signal consists of a plurality of component signals each having a different sampling frequency;
   the blocking means forms the plurality of blocks to equalize areas of small area segments of the input video signal that correspond to the plurality of component signals and at the same time constructs a macro block from the plurality of blocks in which the small area segments of the input video signal are coincident with each other; and
   the first quantizing means sets a quantization accuracy en bloc per the macro block.

4. The apparatus for transmitting a video signal according to claim 1, wherein:
   the dividing means performs a Wavelet transform on the input video signal and recursively divides only a low frequency channel of the input video signal into a plurality of components.

5. The apparatus for transmitting a video signal according to claim 1, further comprising:
   a quantization control means for sequentially setting an accuracy of the second quantizing means from an accumulative coded data quantity with reference to the accumulative coded data quantity every time when the variable length coding for each of the plurality of components is ended.

6. The apparatus for transmitting a video signal according to claim 5, further comprising:

a rearranging means provided between the first quantizing means and the second quantizing means, and for sequentially rearranging channels of the input signal from a low frequency channel and effecting an output thereof; and a transmission stopping control means for stopping transmission of the plurality of components which are being processed when the cumulative coded data quantity exceeds a predetermined coded data quantity before all of the plurality of components undergo both the second quantization and variable length coding.

7. The apparatus for transmitting a video signal according to claim 6, wherein:

the rearranging means is composed of a memory which reads one of input coefficients of the second quantizing means and inputs the one of the input coefficients to the second quantizing means, when processing of one of output coefficients for the second quantizing means is terminated.

8. A video signal transmitting method, comprising the step of:

recursively dividing only a low frequency channel of an input video signal;

forming a plurality of blocks corresponding to small area segments of the input video signal with coefficients each belonging to each of the plurality of components;

effecting a first quantization per the block;

effecting a second quantization for each of the plurality of components with respect to a first quantization coefficient obtained by the first quantization; and effecting a variable length coding with respect to a second quantization coefficient obtained by the second quantization.

9. The video signal transmitting method according to claim 8, wherein:

the input video signal consists of a plurality of component signals each having a different sampling frequency, and the plurality of blocks are formed so that sizes of the small area segments of the input video signal that correspond to the plurality of component signals are equal; and an accuracy of the first quantization is set en bloc per each of the plurality of blocks.

10. The video signal transmitting method according to claim 8, wherein:

the input video signal consists of a plurality of component signals each having a different sampling frequency, and the plurality of blocks are formed so that sizes of small area segments of the input video signal correspond to the plurality of component signals are equal;

a macro block is formed to include the plurality of blocks in which the small area segments of the input video signal are coincident with each other; and an accuracy of the first quantization is set en bloc per the macro block.

11. The video signal transmitting method according to claims 8, wherein:

the input video signal is divided by a Wavelet transform.

12. The video signal transmitting method according to claim 8, wherein:

a coded data quantity allocated to a fixed amount of input video signals is previously set;

when the second quantization and variable length coding are effected on a first quantization coefficient for each of the plurality of components, an accumulative coded data quantity is generated each time the second quantization and variable length coding with respect to the plurality of components are terminated; and the second quantization accuracy is sequentially set on the basis of the accumulative coded data quantity.

13. The video signal transmitting method according to claim 11, wherein:

the processing is performed sequentially from a low frequency channel having a higher significance, and then, when exceeding a predetermined coded data quantity before all of the plurality of components have undergone the second quantization and variable length coding, the transmission of unprocessed components having lower significance is stopped.

14. The video signal transmitting method according to claim 12, wherein:

a first quantization coefficient obtained by the first quantization is stored into a memory; and when processing of one of output coefficients from the memory for the second quantization is terminated, one of input coefficients to the second quantizing means is read from the memory after making a predetermined rearrangement.

15. A video signal transmitting apparatus for decoding and transmitting a coded video data, comprising:

a variable length decoding means for variable-length-decoding the coded data in the transmission data;

a first inverse quantizing means for inverse-quantizing an output of the variable length decoding means on the basis of a first quantization control signal and outputting a first inverse quantization coefficient;

a second inverse quantizing means for inverse-quantizing the first inverse quantization coefficient on the basis of a second quantization control signal and outputting a second inverse quantization coefficient;

a first rearranging means for rearranging the second inverse quantization coefficient according to a plurality of components to produce a decoding coefficient; and a reconstructing means for reconstructing the video signal from the decoding coefficient rearranged according to the plurality of components.

16. The video signal transmitting apparatus according to claim 15, further comprising:

a second rearranging means provided between the first quantizing means and the second inverse quantizing means, the second rearranging means rearranging the first inverse quantization coefficients in a predetermined array.

17. The video signal transmitting apparatus according to claim 15, wherein:

the first inverse quantizing means performs predetermined weighing on the basis of the first quantization control signal.

18. The video signal transmitting apparatus according to claims 15, wherein:

the reconstructing means reconstructs the video signal from the decoding coefficient by effecting an inverse Wavelet transform.

19. A video signal transmitting method for decoding and transmitting a coded video data, comprising the steps of:

variable-length-decoding the coded video data in the transmission data;

effecting a first inverse quantization on the basis of the first quantization control signal with respect to a decoded coefficient which has been variable-length-decoded;

performing a second inverse quantization of a first inverse quantization coefficient obtained by the first inverse quantization effected on the basis of the second quantization control signal;

making a first rearrangement to rearrange second inverse quantization coefficients obtained by the second inverse quantization according to the plurality of components; and reconstructing the video signal from decoded coefficients rearranged according to the plurality of components.

20. The video signal transmitting method according to claim 19, wherein:

a second rearrangement is effected to rearrange the first inverse quantization coefficients in a predetermined array between the first inverse quantization and the second inverse quantization.

21. The video signal transmitting method according claim 19, wherein:

the first inverse quantization effects a predetermined weighting processing on the basis of the first quantizing control signals.

22. The video signal transmitting method according claim 19, wherein:

the reconstruction is to reconstruct the video signal from the decoding coefficient rearranged according to the plurality of components by an inverse Wavelet transform.

* * * * *